United States Patent [19]
Garvey et al.

[11] Patent Number: 5,774,667
[45] Date of Patent: Jun. 30, 1998

[54] METHOD AND APPARATUS FOR MANAGING PARAMETER SETTINGS FOR MULTIPLE NETWORK DEVICES

[75] Inventors: Eleanor T. Garvey, Swampscott; Danny James Hansen, Wellesley, both of Mass.

[73] Assignee: Bay Networks, Inc., Santa Clara, Calif.

[21] Appl. No.: 624,021

[22] Filed: Mar. 27, 1996

[51] Int. Cl.⁶ ........................................... G06F 11/32
[52] U.S. Cl. .................. 395/200.52; 395/200.53; 345/333; 345/339
[58] Field of Search ................... 395/159, 329, 395/333, 326, 330, 356, 200.5, 200.51, 200.52, 200.53, 200.54, 200.58, 200.66; 340/825; 345/969, 975, 333, 334, 335, 352

[56] References Cited

U.S. PATENT DOCUMENTS 5,394,522  2/1995  Sanchez-Frank ................. 395/356
5,544,303  8/1996  Maroteaux ....................... 395/357

OTHER PUBLICATIONS

Cicso Rolls out Innovations in Network Management—Cisco, Jun. 1995.

*Primary Examiner*—Frank J. Asta
*Assistant Examiner*—Matthew Kaminer
*Attorney, Agent, or Firm*—Blakely, Sokoloff, Taylor & Zafman, LLP

[57] ABSTRACT

Editing the parameters for several network devices coupled to a computer network can be a cumbersome task. To simplify the task, a method of editing parameter settings for more than one network device using a graphical user interface is introduced. First, a set of network devices is displayed on a display screen. Then, a user selects a set of network devices to edit parameters for. Next, a list of parameters for the selected network devices is displayed on a display screen. The parameters that have the same value for all the selected network devices are displayed on the screen. However, parameters that do not have the same value for all the selected network devices are not displayed on the screen. Instead, the field is usually left blank. A user can edit the parameter settings displayed on the screen. When a parameter modification is approved, the modified parameter value is sent to all the selected network devices.

20 Claims, 13 Drawing Sheets

5,774,667

METHOD AND APPARATUS FOR MANAGING PARAMETER SETTINGS FOR MULTIPLE NETWORK DEVICES

FIELD OF THE INVENTION

The present invention relates to the field of computer network management. In particular the present invention discloses a method and apparatus for managing the settings of multiple network devices coupled to a computer network.

BACKGROUND OF THE INVENTION

Personal computers and workstations have become standard work tools in most office environments. To further improve the usefulness of the computer systems, most office computer systems have been linked together into an office Local Area Network (LAN). The Local Area Network allows the computer users at different computer systems to easily share information with each other. The network also allows the computer users to share computer hardware such as printers and modems. Many local area networks consist of a centralized network hub that is coupled to all the end computer systems.

To establish communications with other computer systems not connected to a particular Local Area Network, many Local Area Networks have added network routers that connect the Local Area Network to a larger Wide Area Network. For example, many computer systems are coupled to the global Internet through network routers.

To accommodate workers that are often out in the field or telecommuting workers, many Local Area Networks have added remote access servers. The remote access servers allow remote computers to call-in and connect to a Local Area Network in a manner such that the remote computer has all the capabilities of local computers coupled to the Local Area Network.

This proliferation of network devices has resulted in very large and difficult-to-manage computer networks. For example, a computer network manager may be responsible for installing and maintaining numerous network hubs, network bridges, routers, gateways, file servers, and remote access servers. To simplify the task of managing all these network devices, network management systems have been devised.

To simplify the management of a large number of network devices coupled to a computer network the Simple Network Management Protocol (SNMP) was created. The Simple Network Management Protocol is a standardized protocol for sending network management commands to network devices and receiving status information from the network devices. To manage a computer network using the Simple Network Management Protocol, a network manager runs a network manager program on a workstation coupled to the network. The network manager program displays the status information received from the SNMP compatible network devices coupled to the network. To control the network devices, the network manager program sends out SNMP commands.

In a large computer network there may be a large number of the same type or similar network devices. For example, in a large 10Base-T Ethernet network, there may be several 10Base-T Ethernet hubs to service all the network nodes. In another example, an Internet service provider may have several remote access servers coupled to modems that answer calls from customers that dial-in. In many cases, the network manager will want to configure a number of devices in the exact same manner. Thus, it would be desirable to have a network manager program that clearly displays the settings of multiple network devices.

SUMMARY OF THE INVENTION

A method of editing parameter settings for more than one network device is disclosed. First, a set of network devices is displayed on a display screen. To edit parameters for a particular network device, the user selects that network device on the display screen using a cursor control device. Next, a list of parameters for the selected network devices is displayed on the display screen. The parameters that have the same value for all the selected network devices are displayed on the screen. However, parameters that do not have the same value for all the selected network devices are not displayed on the screen. Instead, the fields for those parameters are usually left blank. A user can edit the parameter settings by modifying the parameter fields displayed on the screen. When a set of modified parameters are approved the user, then the user instructs the network management program to send the modified parameter values to all the selected network devices.

BRIEF DESCRIPTION OF THE DRAWINGS

The objects, features and advantages of the present invention will be apparent to one skilled in the art, in view of the following detailed description in which.

DETAILED DESCRIPTION OF THE PREFERRED EMBODIMENT

A method and apparatus for managing parameter settings for multiple network devices is disclosed. In the following description, for purposes of explanation, specific nomenclature is set forth to provide a thorough understanding of the present invention. However, it will be apparent to one skilled in the art that these specific details are not required in order to practice the present invention. For example, the present invention has been described with reference to graphical user interface for managing multiple remote access servers. However, the same techniques can easily be applied to any type of management system that must manage multiple entities.

An Exemplary Computer Local Area Network

Figure 1:
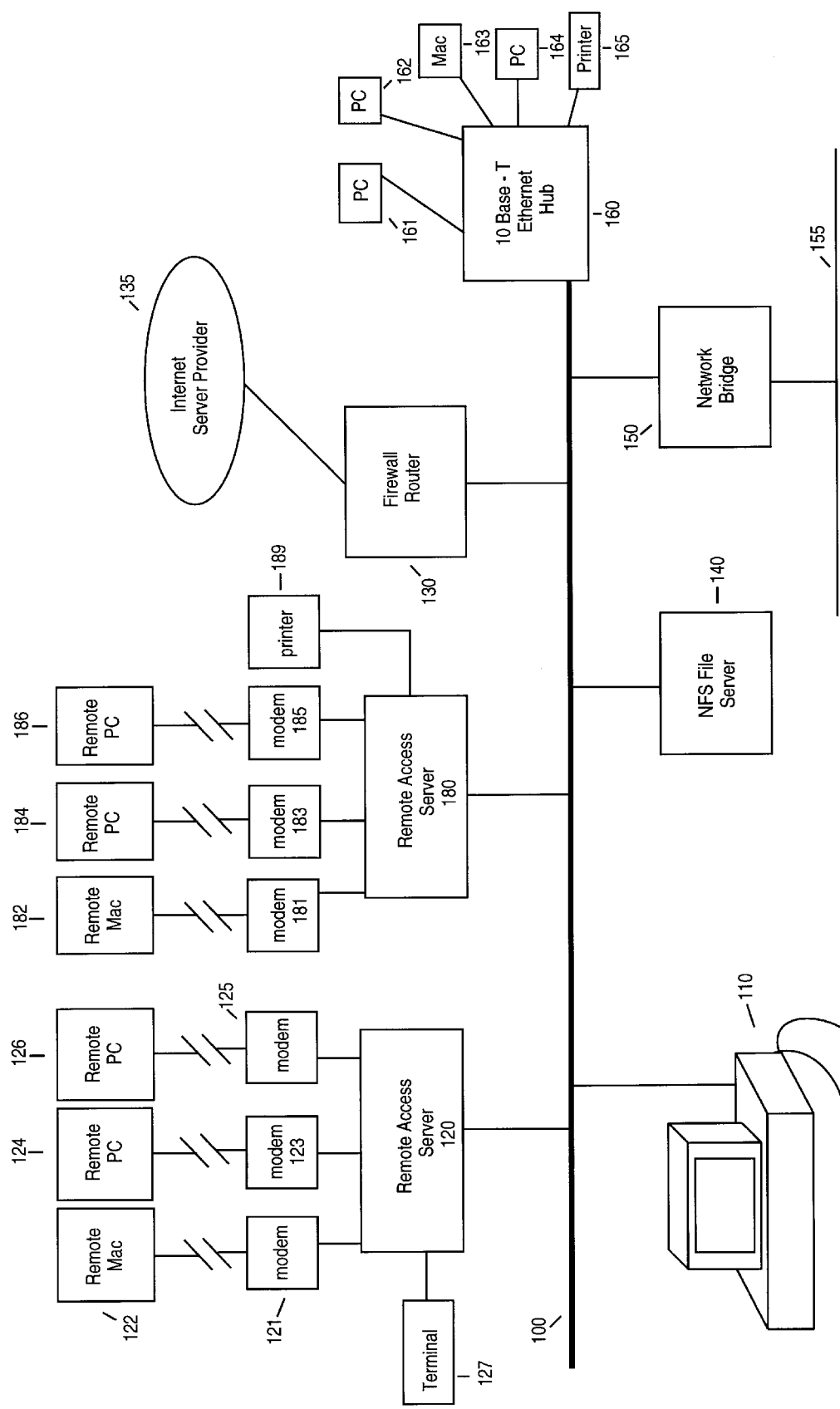
FIG. 1 illustrates a block diagram of a complex computer network.

FIG. 1 illustrates an exemplary Local Area Network (LAN) that couples several computer systems. In the example network of FIG. 1, the main network segment 100 of the LAN is a coaxial (thicknet) Ethernet segment. Coupled to the main network segment 100 are several network devices including a first remote access server 120 for to allow computers to dial-into and out-of the network, a second remote access server 180, a firewall router 130 for coupling the LAN to the Internet, an NFS file server 140, a network bridge 150 for communicating with devices on a second LAN 155, and a 10Base-T Ethernet hub 160 for coupling devices to the LAN with inexpensive twisted pair wiring.

To control the various network devices, a network management workstation 110 is coupled to the network. The network management workstation 110 executes a network management program that issues network management commands using some network management protocol such as Simple Network Management Protocol (SNMP) or Common Management Information Protocol (CMIP). The present embodiment sends and receives Simple Network Management Protocol (SNMP) messages.

A Network Management Workstation

Figure 2:
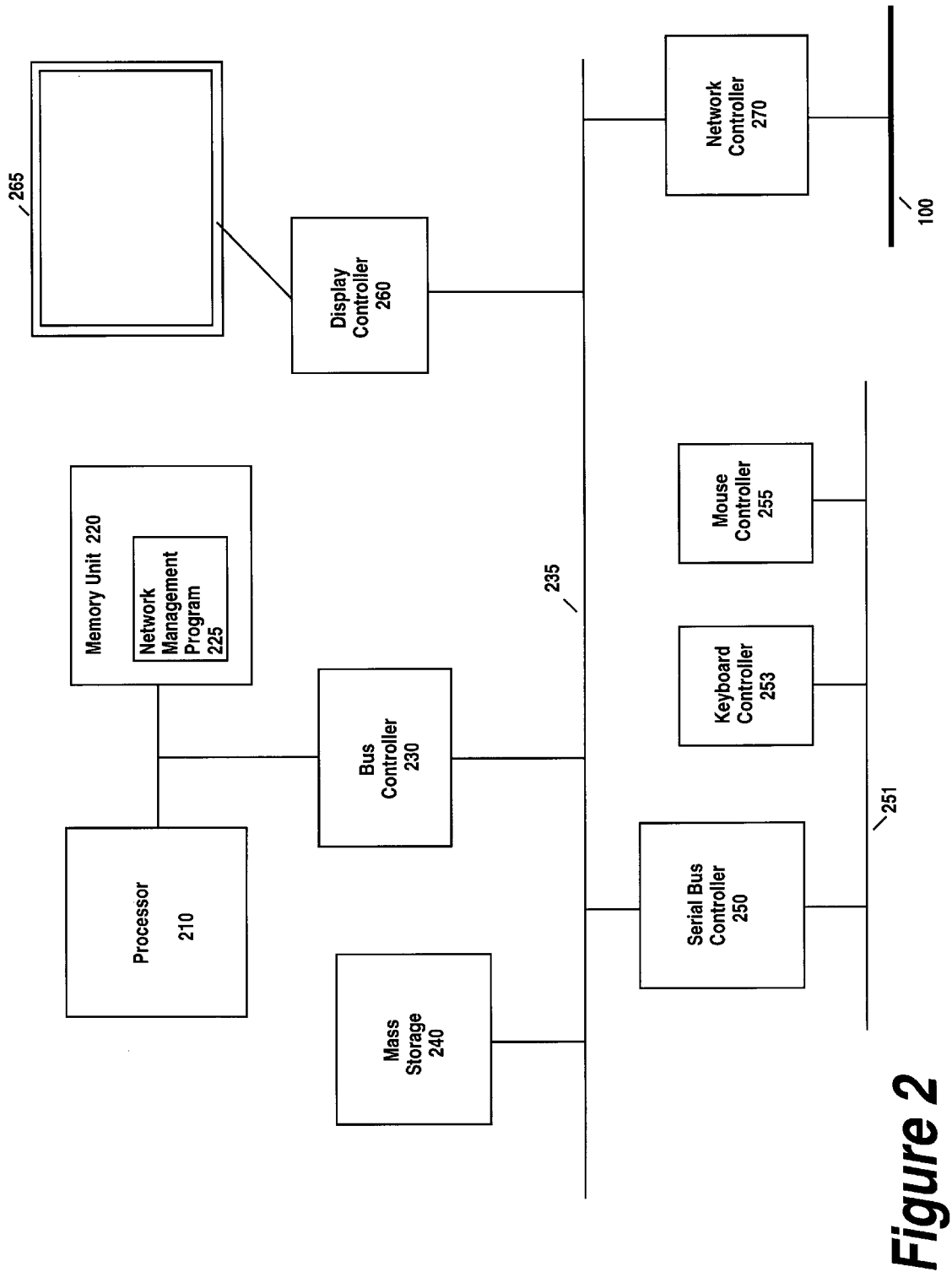
FIG. 2 illustrates a block diagram of a general purpose computer system that can be used to run a network management program.

FIG. 2 illustrates a block diagram of a general purpose computer system that can be used as a network management workstation 110. The computer system includes a processor 210 for executing instructions and a memory unit 220 coupled to the processor for storing instructions and data. A bus controller 230 controls a peripheral bus 235 that is coupled to several computer peripherals including a mass storage unit 240, a display controller 260 for driving computer display 265, a serial bus controller 250, and a network controller 270 coupled to a computer network 100. The serial bus controller 250 controls a serial bus 251 is further coupled to a keyboard controller 253 and a mouse controller 255 for accepting input from a user.

To control the network devices coupled to the Local Area Network 100, the network management workstation 110 executes a network management program 225. The network management program monitors the network segment 100 for network status messages such as SNMP traps. The network management program 225 also polls the various network devices to obtain information from those network devices. The status of the network devices can be displayed graphically on the display screen coupled to the network management workstation 110. To effect changes requested by a user, the network management program 225 sends requests to the manageable network devices.

Managing Network Devices With a Graphical User Interface

To simplify the task of managing the network devices, the network management program 225 should display information about network devices using a graphical user interface (GUI). In one embodiment of the present invention, the MOTIF Windowing graphical user interface running on a UNIX operating system is used to implement a graphical user interface for the network management program 225. To illustrate how the network management program 225 of the present invention uses a graphical user interface for network management, an example of managing a single remote access server device is described with reference to FIGS. 3–8.

Figure 3:
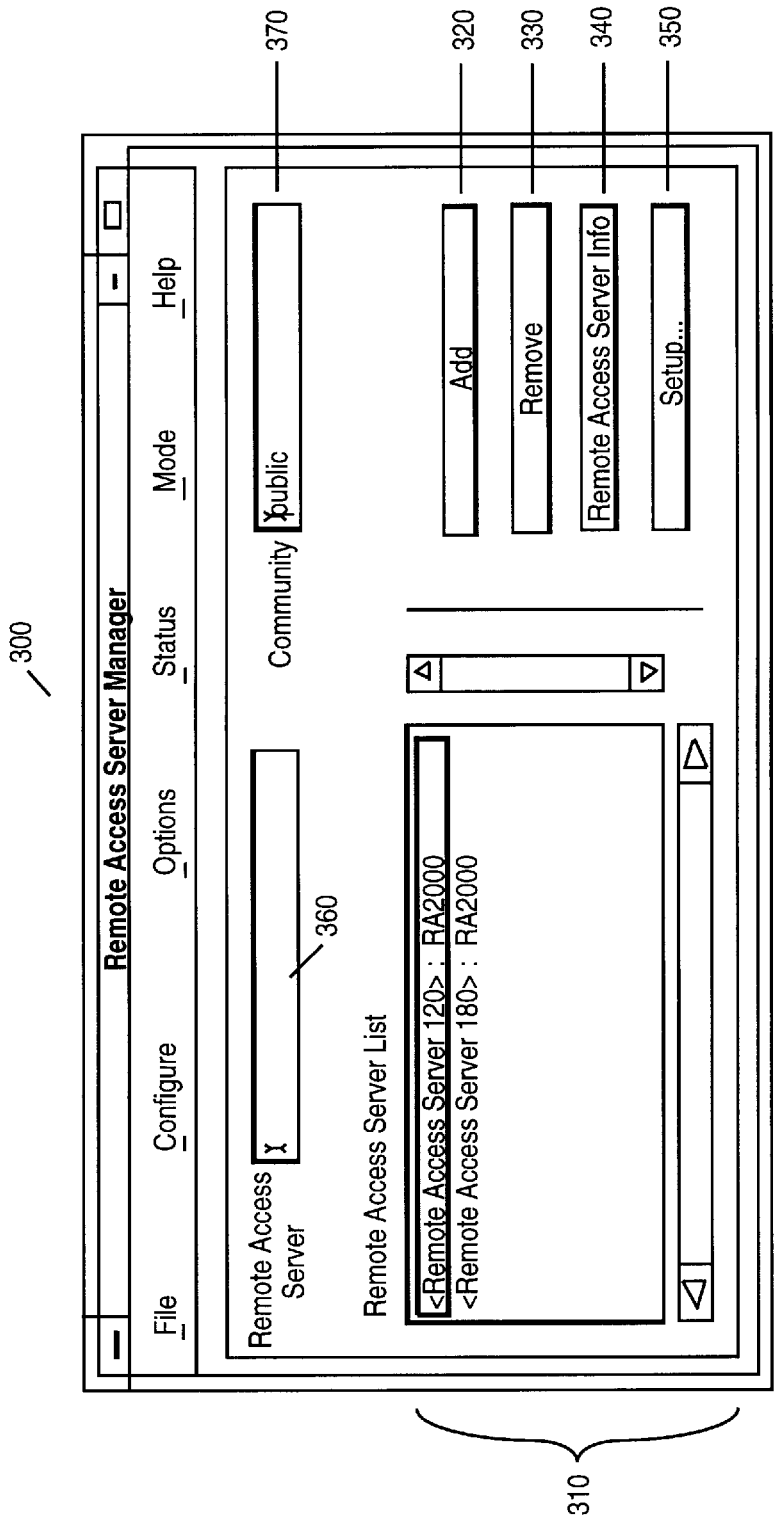
FIG. 3 illustrates a graphical user interface window for managing remote access servers.

FIG. 3 illustrates an initial remote access server manager window 300 for managing remote access servers. Remote access servers are devices coupled to the network that have external interface ports for coupling other devices to the network. For example, remote access server 120 in FIG. 2 couples the network to modems that connect with remote computers across phone lines. The remote access server 120 also couples local terminals to the network.

Referring again to FIG. 3, the remote access server manager window 300 provides a list 310 of the remote access servers coupled to the network. To add a remote access server, the user types the server name or address into data entry field 360, the SNMP community string into data entry field 370, then selects the add button 320. To remove a remote access server from the remote access server list 310, the user selects a remote access server from the list and then selects the remove button 330. A confirmation window will appear to confirm the user's decision to remove a remote access server. To learn more about a particular remote access server, the user selects a remote access server from the list and then selects the comm. server info button 340.

Figure 4:
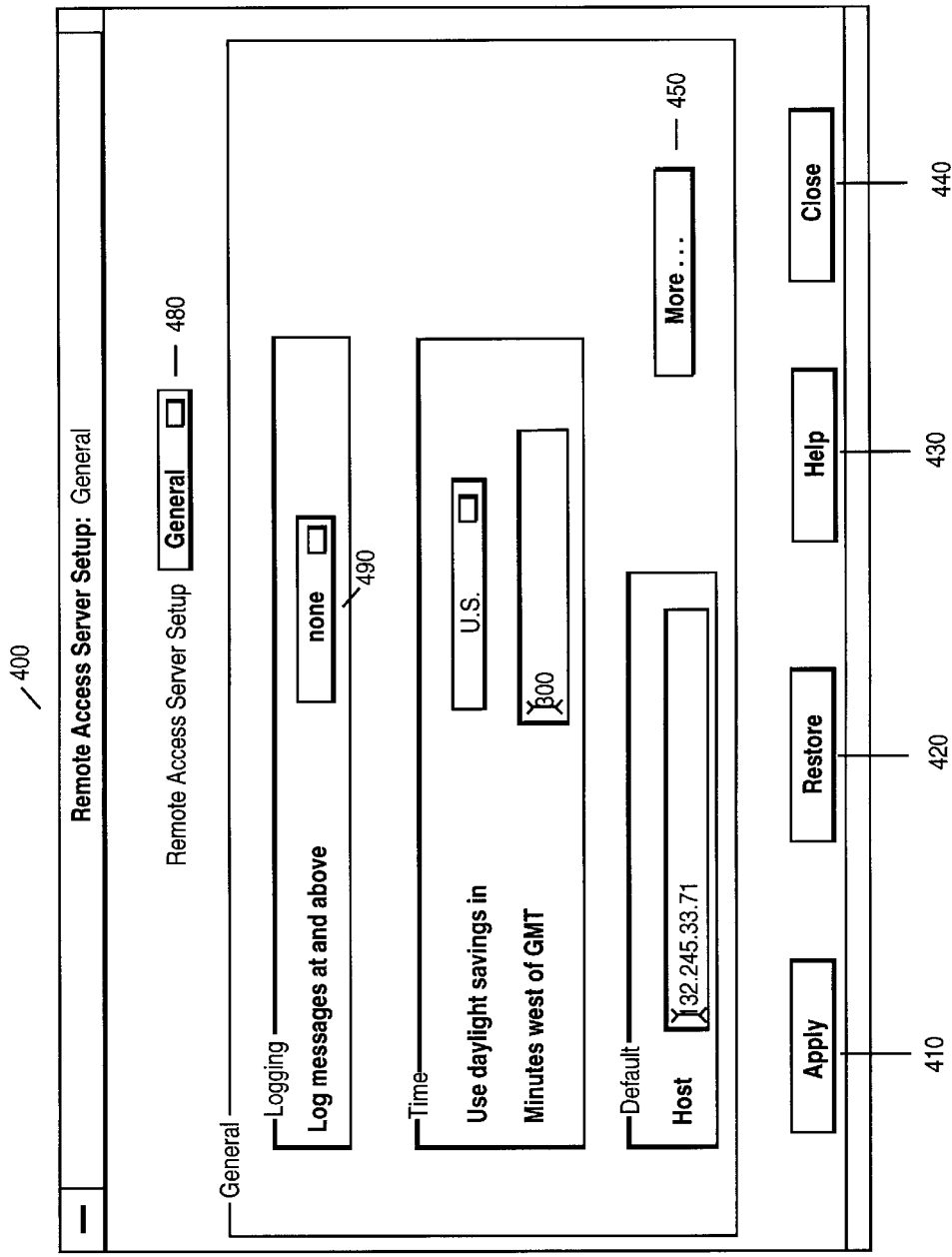
FIG. 4 illustrates a first graphical user interface window for setting up a remote access server.

Initially setting up the parameters for a remote access server is not a trivial task. To simplify the set-up procedure, the remote access server manager window 300 has a setup button 350 that guides the user through a series of set-up windows. When the user selects the setup button 350, then a first general set-up window 400 is displayed as illustrated in FIG. 4. The first general setup window allows the user to set logging, time, and host parameters for the remote access server. After changing any of the parameters, the user can select the Apply button 410 to have the changes set to the remote access server. If the user changes her mind, then she can select the Restore button 420 to restore the previous parameter values that were there before the Apply button 410 was selected. A help button 430 allows the user to obtain more information about the general setup window 400. If the user selects the close window, then a verification window will appear to ask the user if she would like to apply any changes that have been entered.

Figure 5:
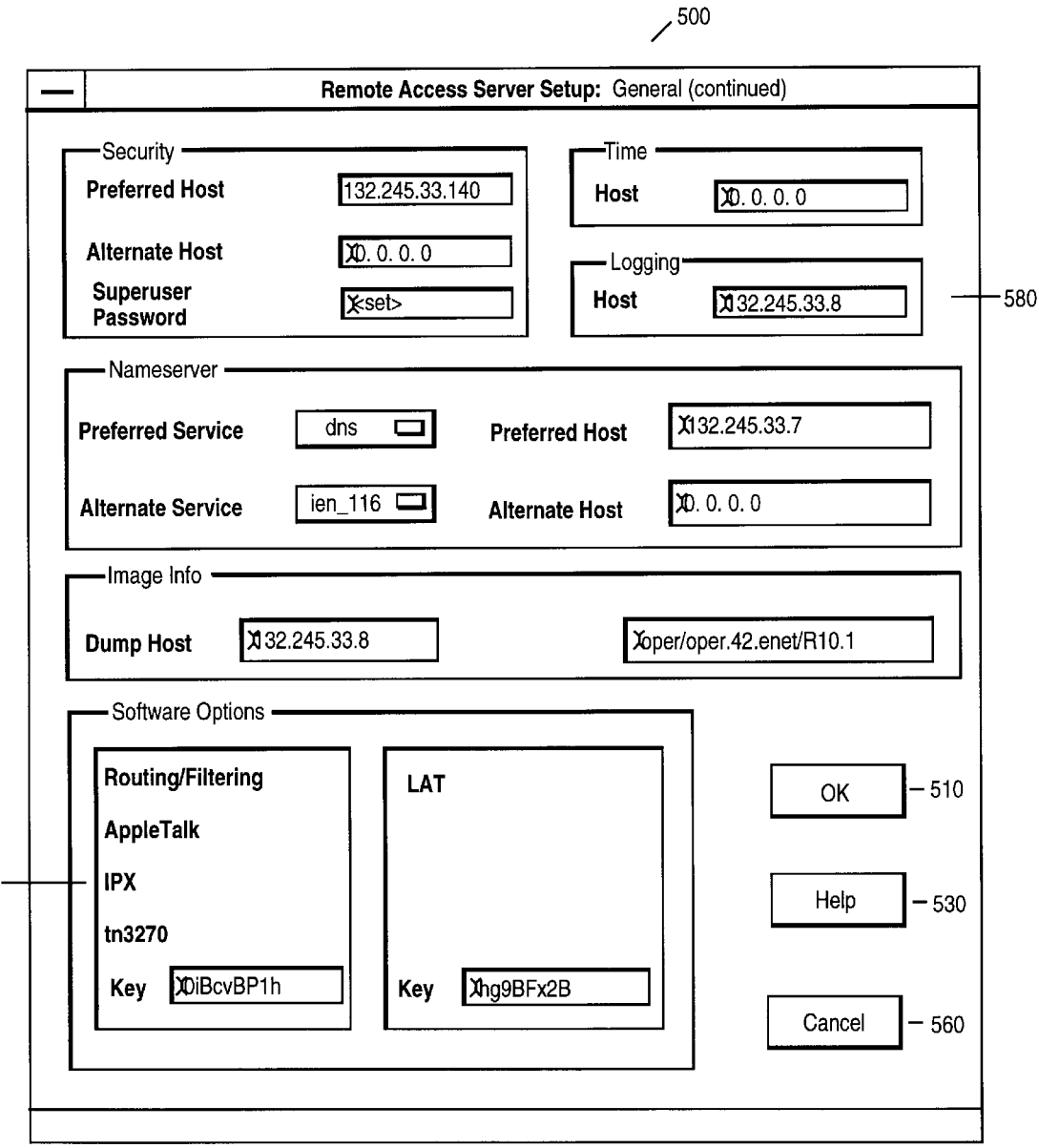
FIG. 5 illustrates a second graphical user interface window for setting up a remote access server.

To set up additional parameters for the remote access server, the user selects the More button 450 that moves the user along to the second general setup window 500 as illustrated in FIG. 5. The second general setup window 500 allows the user to edit additional parameters that define the operation of the remote access server such as security hosts, a time host, a logging host, designate nameservers, and software options. Once the desired parameter changes have been made, the user selects the OK button 510 to return to the first general setup window 500. Alternatively, the user can select a Cancel button 560 to cancel the change changes that have been entered. Like the first general setup window, the second setup window 500 has a Help Button 530 that will provide additional help to the user if desires.

Referring back to FIG. 4, the first general set up screen 400 includes a setup window selector 480. This setup window selector 480 allows the user to select other setup windows for setting up remote access server parameters. In the present embodiment, the other setup windows include an async interface ports setup window, a security setup window, an Appletalk protocol setup window, an IP protocol setup window, an IPX protocol setup window, and a LAT setup window. For example, FIG. 6 illustrates the async ports setup window 600.

Figure 6:
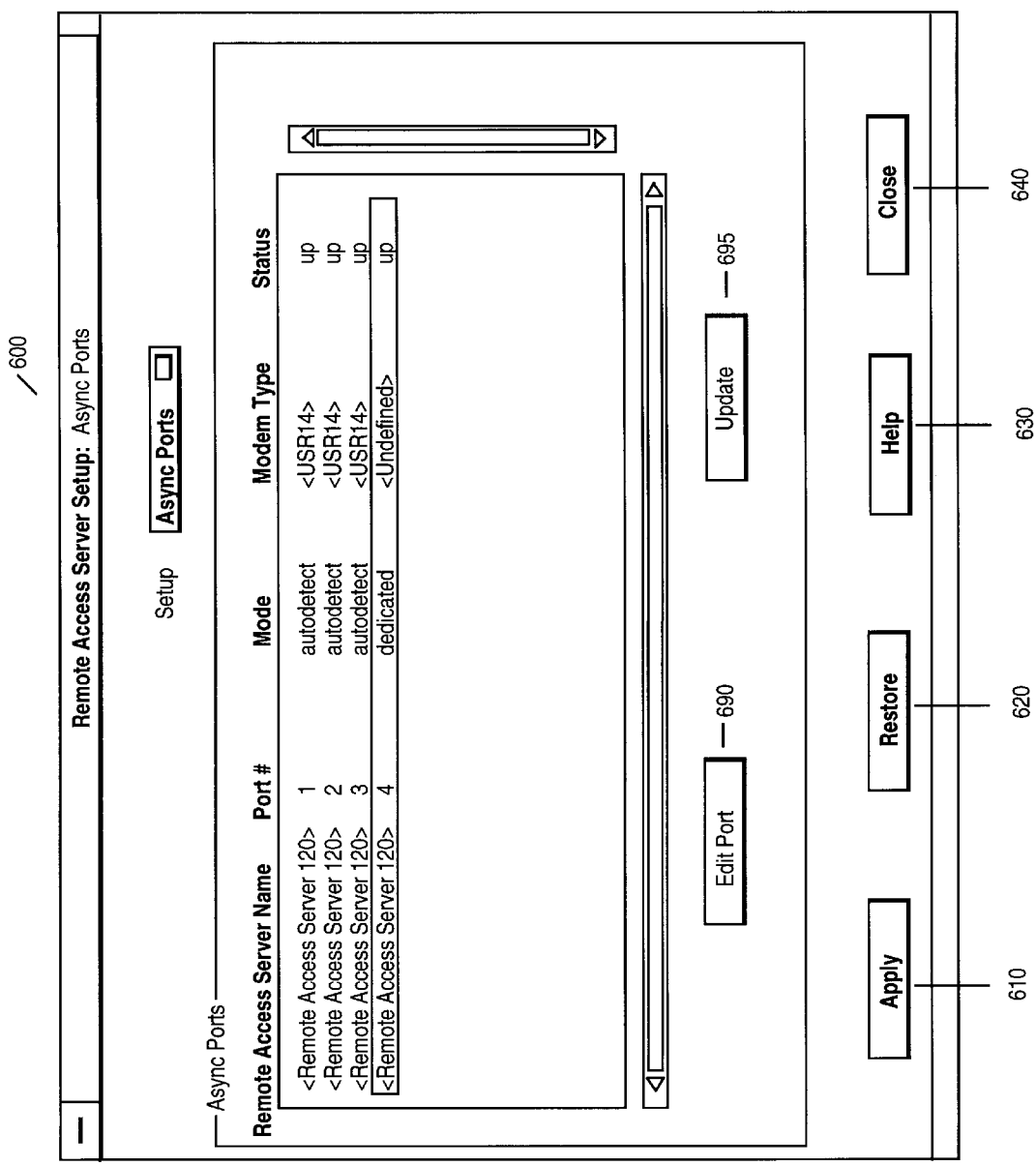
FIG. 6 illustrates a graphical user interface window for managing asynchronous interface ports on a remote access server.
Figure 7:
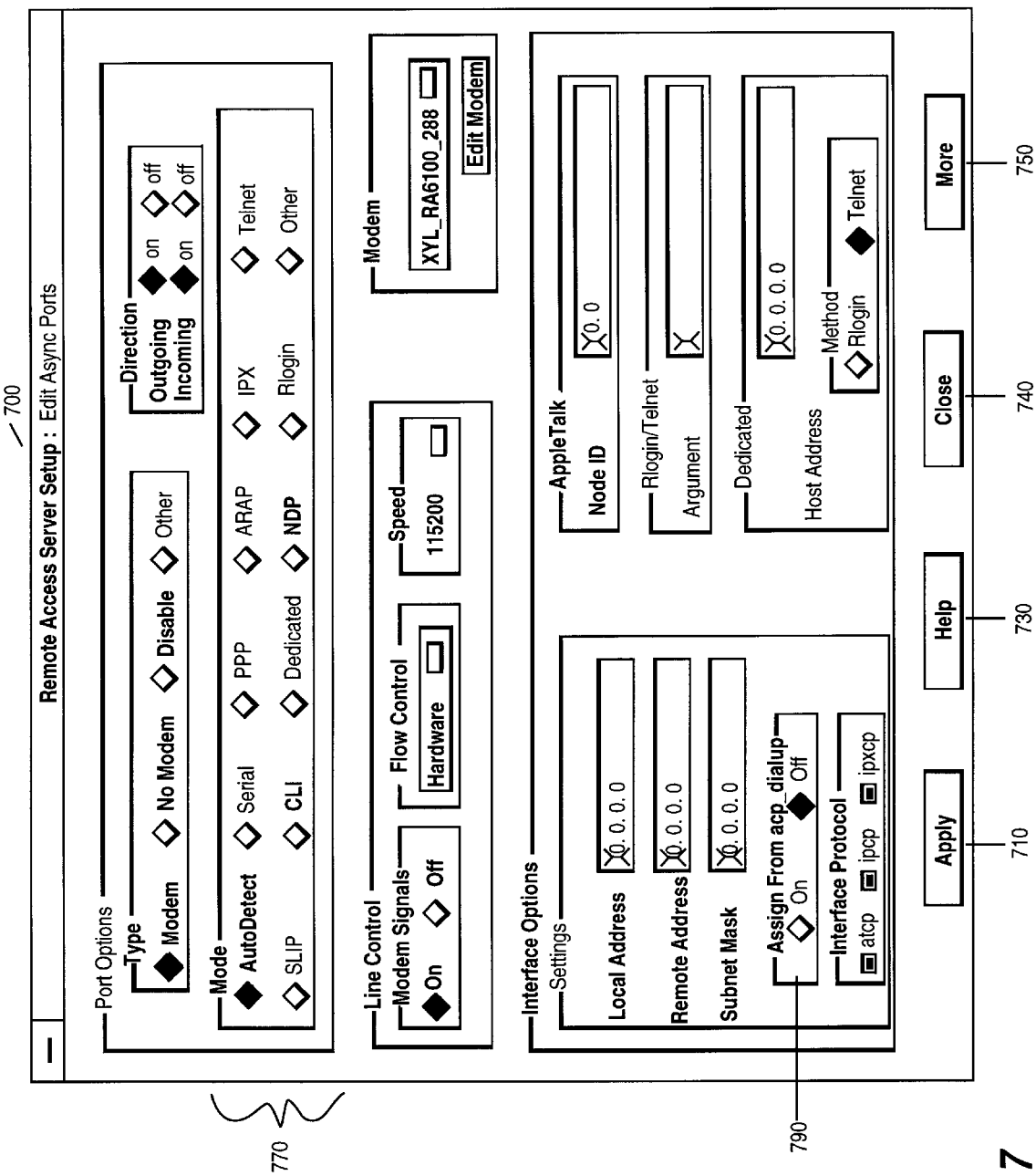
FIG. 7 illustrates a first graphical user interface window for setting up asynchronous interface ports on a remote access server.

In the async ports setup window 600 of FIG. 6, a list of asynchronous interface ports for the selected remote access server is presented. To edit the parameters for a particular async interface port, the async interface port is selected and then the edit port button 690 is selected. This action then presents the user with the first edit async port setup window 700 as illustrated in FIG. 7.

The first edit async port setup window 700 displays a number of parameters that may be set for each async interface port. For selections where one of a multiple number of choices may be selected, a choice description and push button is displayed for each choice. For example, in FIG. 7 the port mode 770 that will be assigned to the async interface port is displayed as a set of options with radio buttons. Similarly, yes/no and on/off parameter selections are displayed with a pair of radio buttons such as the "assign from acp_dialup" field 790.

Figure 8:
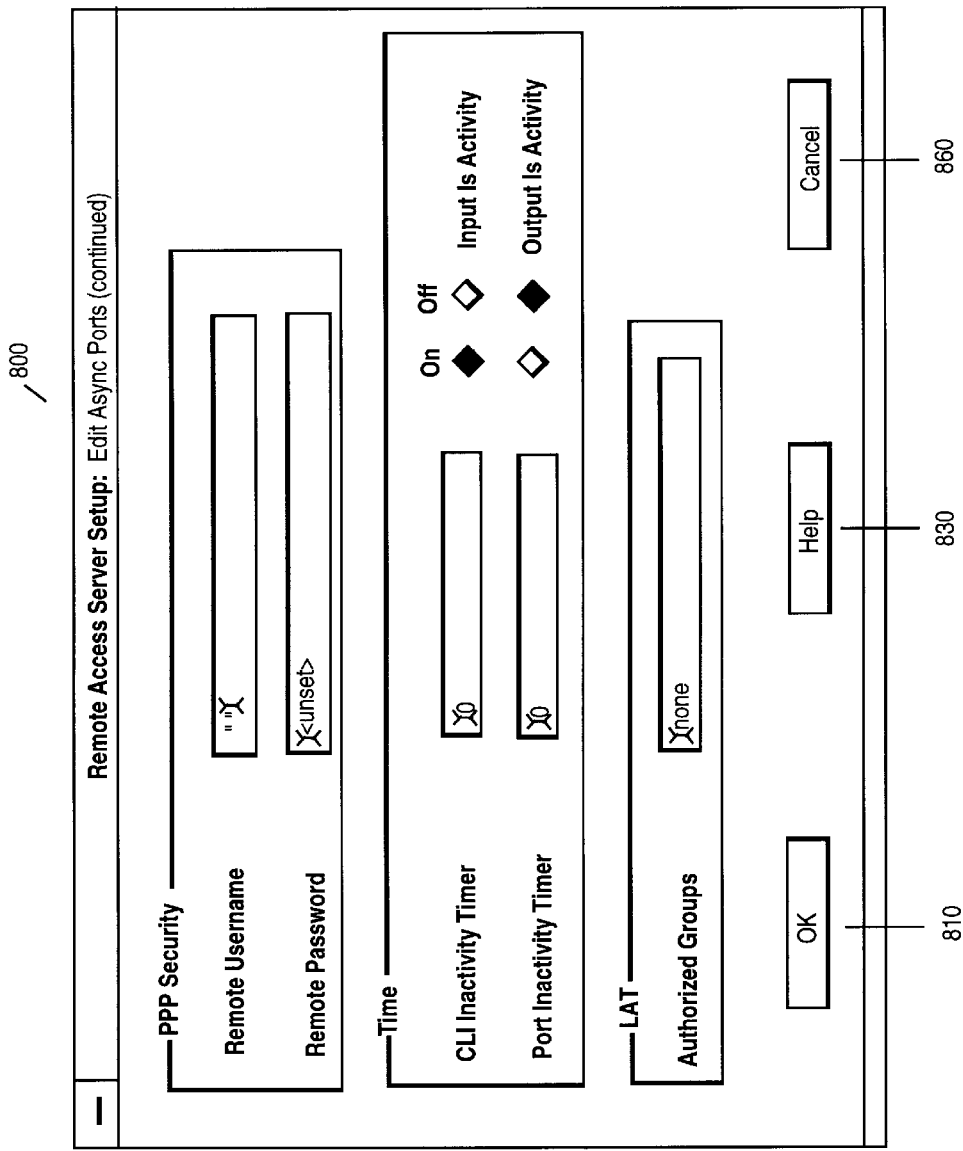
FIG. 8 illustrates a second graphical user interface window for setting up asynchronous interface ports on a remote access server.

To edit additional async interface port settings, the user selects the more button 750 that brings up the second edit async port setup window 800 as illustrated FIG. 8. To send the async interface port changes to the remote access server, the user selects the Apply button 710.

Managing Multiple Network Devices

In many computer networks there exists more than one of the same type of network device. For example, in the network of FIG. 1, there are two separate remote access servers 120 and 180. Each remote access server has several asynchronous interface ports that can be coupled to modems, local terminals, printers, etc. The remote access servers 120 and 180 are used for communicating with remote computers across phone lines using modems. The remote access servers are also used to communicate with local terminals and printers.

When configuring more than one of the same type of network device, it would be desirable to have the ability to edit multiple devices at the same time. One reason that this is desirable is that often the same type of network device will be set-up very much in the same manner. The present invention uses a set of intuitive graphical user interface cues that allow multiple instances of the same type of network device to be set up simultaneously with the same windows used to set up a single network device. To best illustrate how the present invention accomplishes this result, an example will be describe with reference to the two remote access servers of FIG. 1.

Figure 9:
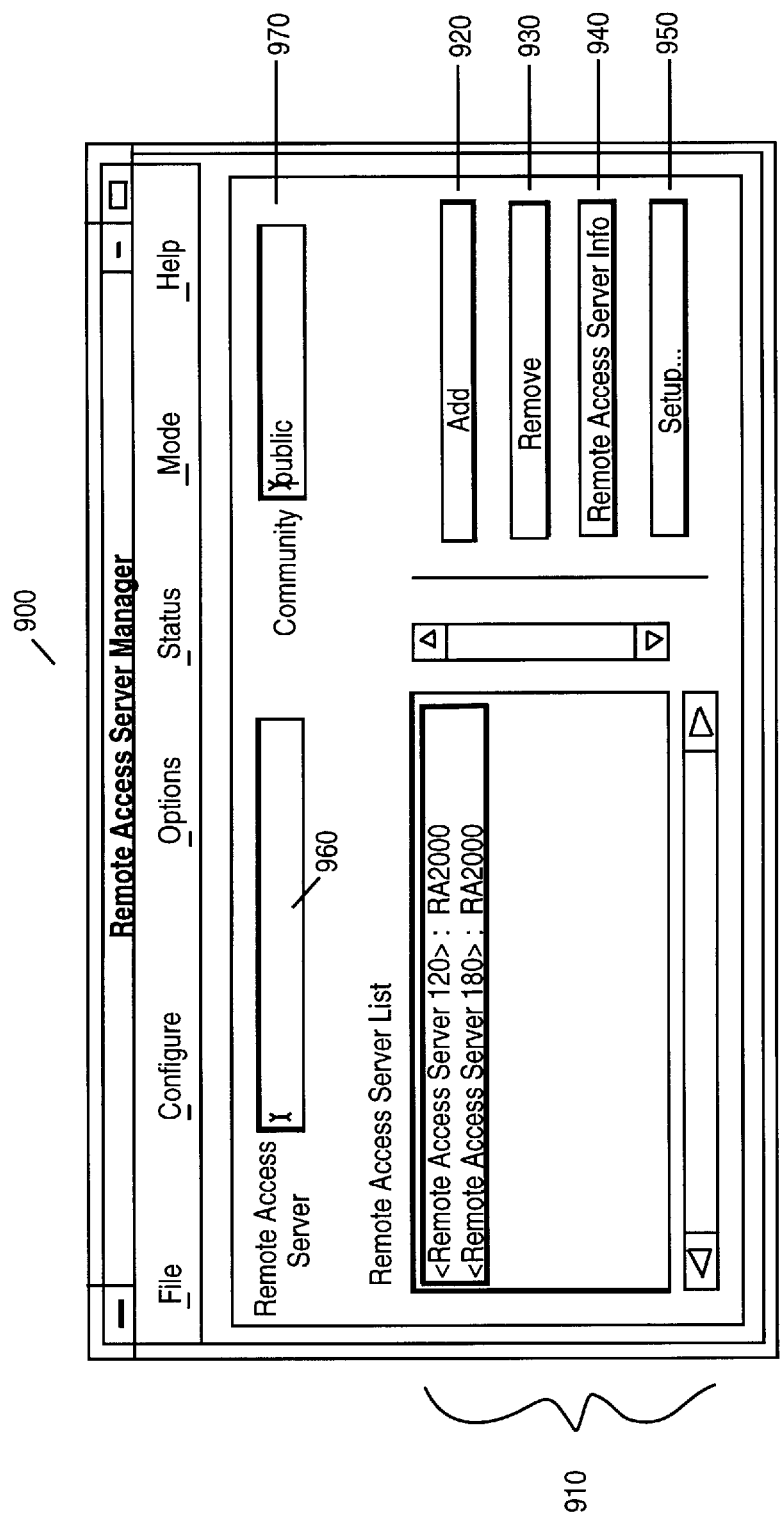
FIG. 9 illustrates a graphical user interface window for managing remote access servers where two remote access servers are selected.

To edit the parameters of the two remote access servers at the same time, both of the two remote access servers are selected in the remote access server setup window as illustrated in FIG. 9. One method of selecting both remote access servers is to hold the control key down while selecting the two remote access servers with a cursor control device. After selecting the desired remote access servers from the remote access server list, the user selects the setup button 950 to edit the selected set of remote access servers simultaneously.

Figure 10:
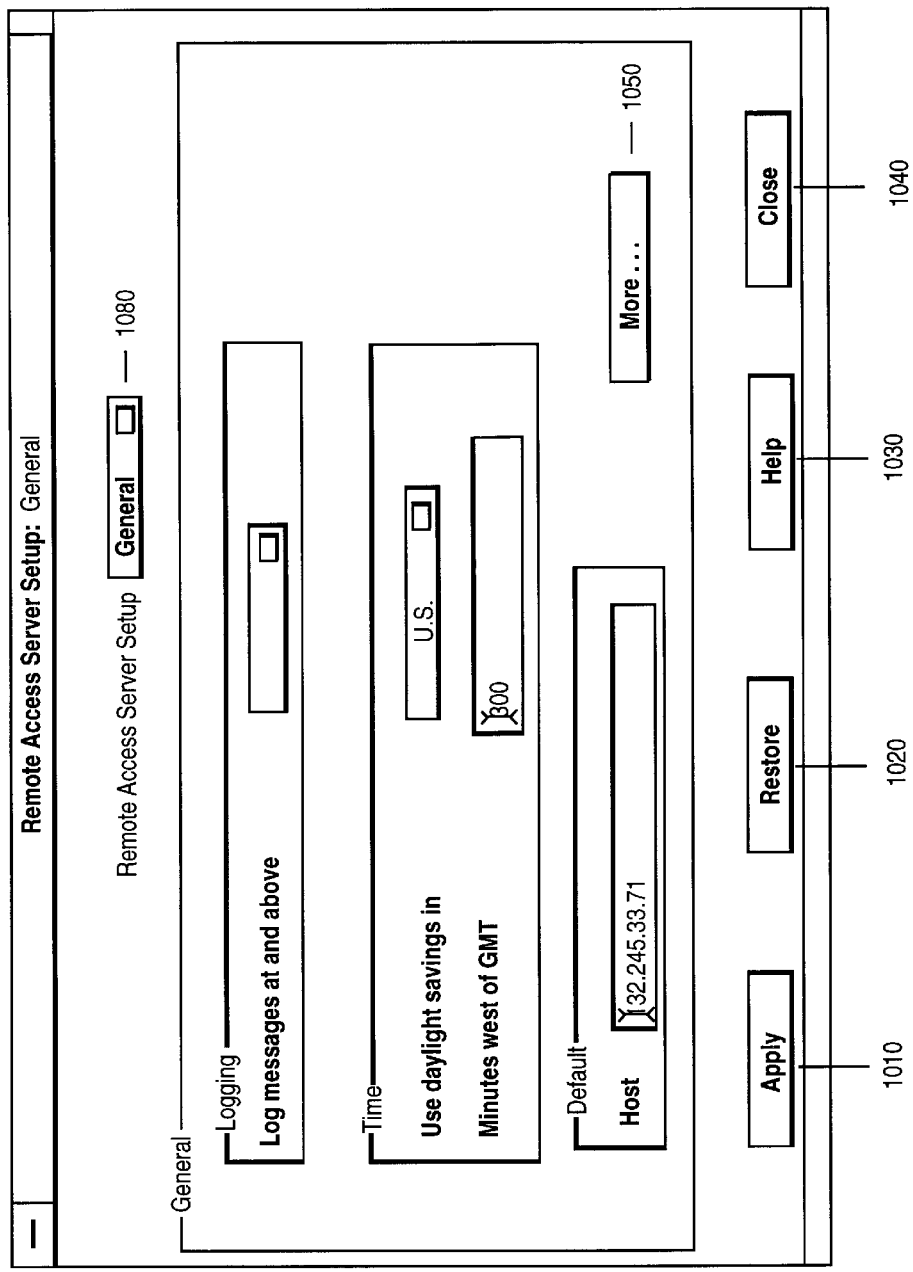
FIG. 10 illustrates a first graphical user interface window for setting up two remote access servers simultaneously.

After pressing the setup button 950, then the first general setup window is displayed as illustrated in FIG. 10. At this point however, all the parameters displayed in parameter fields apply to both of the two remote access servers that are being set up.

If the two remote access servers have different parameter values for a particular parameter, then that parameter is displayed in manner that indicates that the two different remote access servers have different parameter values. In one embodiment of the present invention, if the two remote access servers have different parameter values for a particular parameter set using a pop up menu, then that parameter menu field is left blank. For example, in FIG. 10, the two different remote access servers have different logging levels such that logging level display as blank. However, if the user can adjusts the value of the logging level, then the new setting will apply to both remote access servers.

Figure 11:
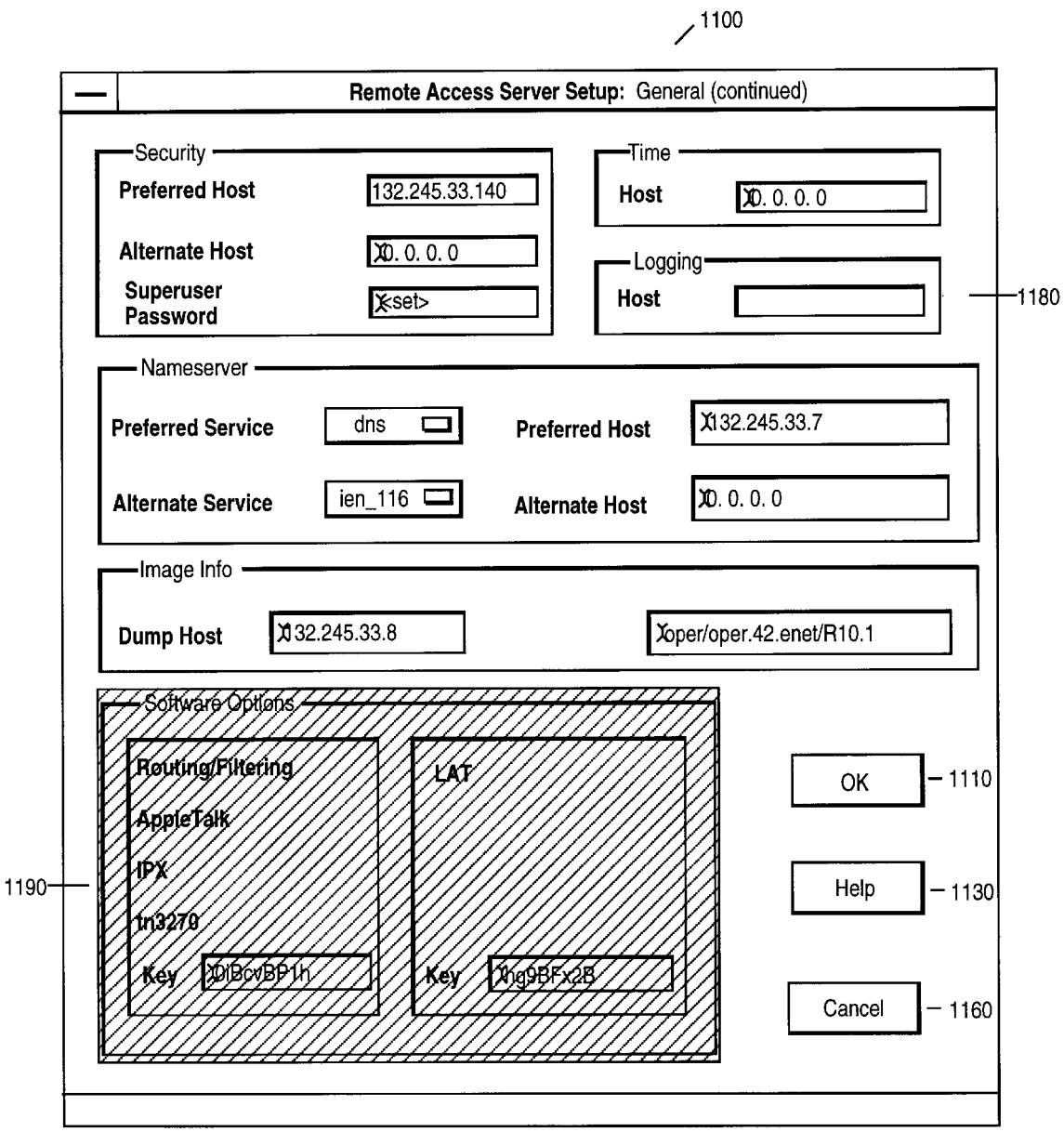
FIG. 11 illustrates a second graphical user interface window for setting up two remote access servers simultaneously.

FIG. 11 illustrates the second general setup window 1190 for the two remote access servers. In one embodiment of the present invention, if the two remote access servers have different parameter values for a particular parameter field that is normally displayed as a numerical value or as a string, then that parameter field is displayed as blank. For example, in FIG. 11 the two different remote access servers have designated different logging hosts such that the numerical logging host address field is displayed as blank.

If particular parameter field can not be the same for both remote access servers, then that parameter field is displayed in a manner that indicates that it cannot be changed. In a present embodiment, such fields are normally displayed as being "grayed out." In another embodiment, such fields are covered with cross-hatching. For example, the remote access servers can not have the same keys for setting the various software options. Thus, the software option area field 1190 in the second general setup window 1190 of FIG. 11 is covered with cross-hatching.

Figure 12:
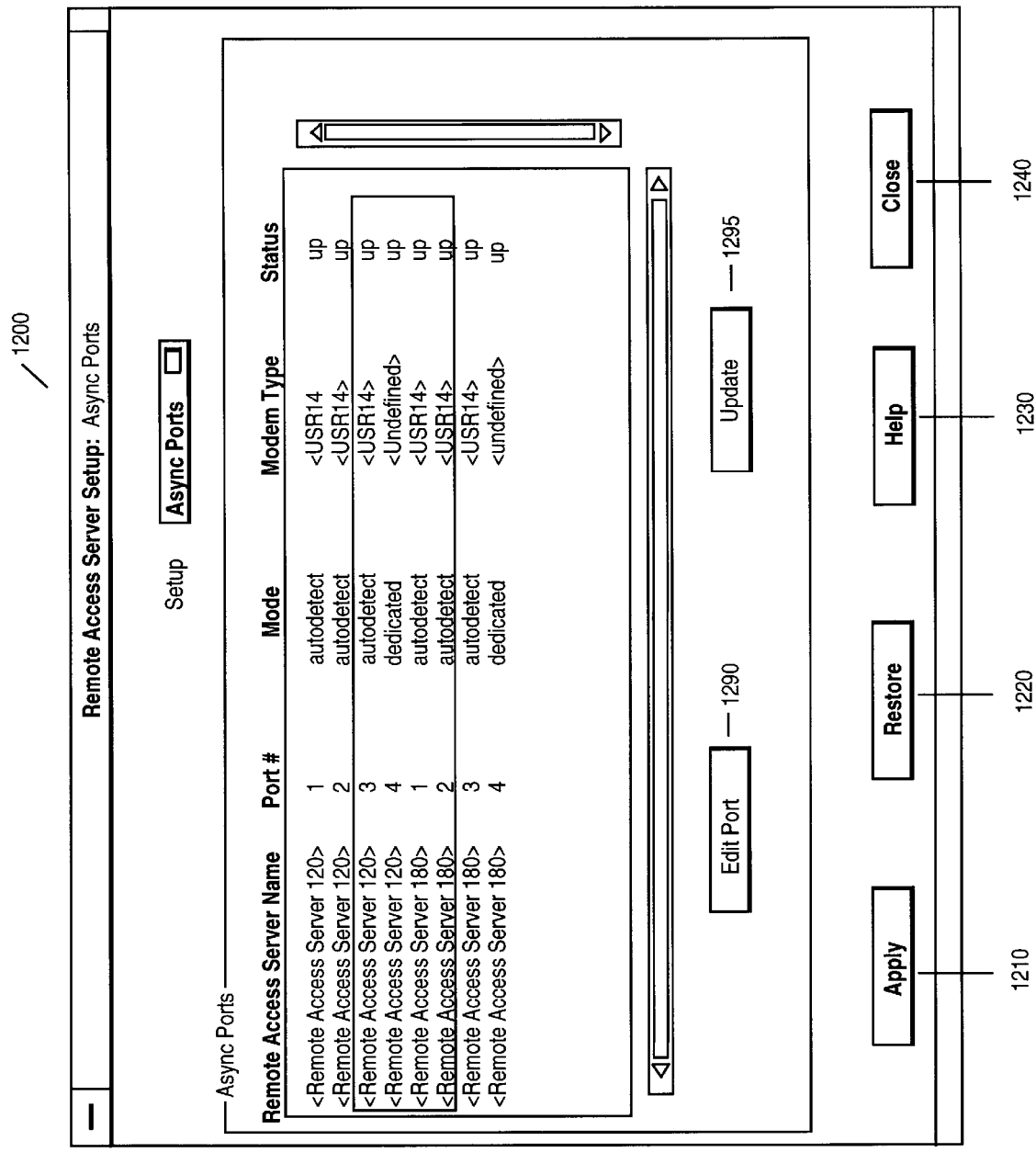
FIG. 12 illustrates a graphical user interface window for managing asynchronous interface ports where four asynchronous interface ports are selected.

The same general procedure can be used to simultaneously edit several asynchronous interface ports on a particular remote access server. Furthermore, several different asynchronous interface ports on several different remote access servers can be edited at the same time. FIG. 12 illustrates an async ports management window 1200 that is displayed when the two remote access servers have previously selected as illustrated in FIG. 9. As illustrated in FIG. 12, all eight interface ports from both remote access servers are listed. To edit multiple interface ports, the user selects the interface ports to be edited and then selects the edit port button 1290. In FIG. 12, a total of four interface ports from two different remote access servers are selected for editing.

Figure 13:
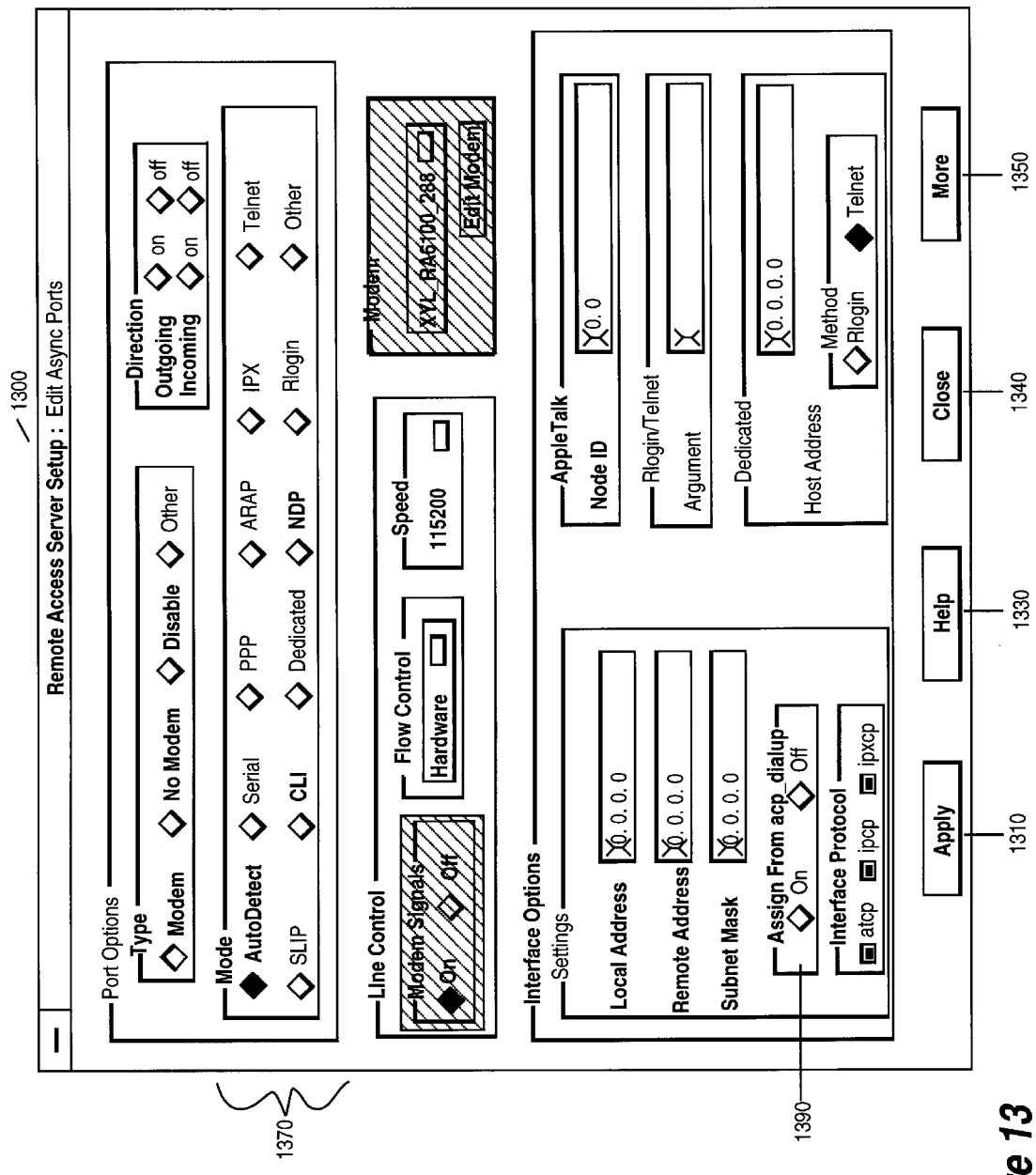
FIG. 13 illustrates a first graphical user interface window for setting up the four selected asynchronous interface ports simultaneously.

After selecting the edit port button on FIG. 12, the async port setup window of FIG. 13 is illustrated. Since the four selected async interface ports have several different settings, that information is displayed in FIG. 13. For example, the different async interface ports have different values for the type parameter field. When the different async interface ports have different values in fields such as the type parameter field that are displayed and edited using as radio buttons, then none of the radio buttons are selected as illustrated in FIG. 13.

For parameters that can have one of two possible states, then a pair of radio buttons are displayed. Normally, one of the two radio buttons is turned on. However, when information for more that one device is displayed and the settings vary for the different devices, then neither button is selected. For example, in FIG. 13 the setting for whether to assign settings from "acp_dialup" is different for the four different async interface ports; to display the varying setting neither the on nor the off radio button is selected.

The foregoing has described a method and apparatus for managing parameter settings for multiple network devices. It is contemplated that changes and modifications may be made by one of ordinary skill in the art, to the materials and arrangements of elements of the present invention without departing from the scope of the invention.

We claim:

1. A method of displaying parameter settings for more than one network device, said method comprising the steps of:

displaying a list of network devices on a display screen;

receiving user input that selects a set from said more than one network devices to generate a set of selected network devices;

displaying a set of parameters for said set of selected network devices on said display screen, said step of displaying comprising displaying the parameters alternatively in a first manner or in a second manner, said first manner indicating that the parameters have identical values for all of said set of selected network devices, and said second manner indicating that the parameters are not identical in all of said set of selected network devices.

2. The method as claimed in claim 1 wherein displaying parameters that do not have identical values in said second manner comprises leaving fields for said parameters that do not have identical values empty on said display screen.

3. The method as claimed in claim 1 wherein a first parameter in said set of parameters has two possible settings and said step of displaying a set of parameters in said second manner comprises displaying an unselected first radio button for a first possible setting and an unselected second radio button for said second possible setting.

4. The method as claimed in claim 1 wherein said step of displaying a set of parameters further comprising displaying a subset of parameters that can not be the same for said set of selected network devices in a manner indicating that the subset of parameters can not be modified.

5. The method as claimed in claim 4 wherein said step of displaying a set parameters further comprises displaying said subset of parameters as being "grayed-out".

6. The method of claim 1 further comprising the steps of:

receiving user inputs that edits one of said parameters on said display screen to generate a modified parameter;

sending said modified parameter to said set of selected network devices.

7. A method of displaying parameter settings for more than one interface on more than one network device, said method comprising the steps of:

displaying a list of network devices on a display screen;

receiving user input that selects from said more than one network device to generate a set of selected network devices; and displaying a set of interfaces associated with said set of selected network devices;

receiving user input that selects a subset from said set of interfaces associated with said set of selected network devices to generate a selected subset of interfaces; and displaying a set of parameters for said set of selected network devices on said display screen, said step of displaying comprising displaying the parameters alternatively in a first manner or a second manner, said first manner indicating that the parameters have identical values for all of said set of selected network devices, and said second manner indicating that the parameters are not identical in all of said set of selected network devices.

8. The method as claimed in claim 7 wherein displaying parameters in said second manner comprises leaving fields for said parameters that do not have identical values empty on said display screen.

9. The method as claimed in claim 7 wherein a first parameter displayed in said second manner that has two possible settings comprises displaying an unselected first radio button for a first possible setting and an unselected second radio button for said second possible setting.

10. The method as claimed in claim 7 wherein said step of displaying a set of parameters further comprises displaying a subset of parameters that can not be the same for said selected subset of interfaces in a manner indicating that the subset of parameters can not be modified.

11. The method as claimed in claim 10 wherein displaying parameters further comprises displaying said subset of parameters as being "grayed-out".

12. The method of claim 7 further comprising the steps of:

receiving user inputs that edits one of said parameters on said display screen to generate a modified parameter; and sending said modified parameter to said set of selected network devices.

13. A machine-readable medium having stored thereon data representing sequences of instructions which, when executed by a processor, cause the processor to perform the steps of:

displaying a list of network devices on a display screen;

receiving user input that selects a set from said more than one network devices to generate a set of selected network devices;

displaying a set of parameters for said set of selected network devices on said display screen, said step of displaying comprising displaying the parameters alternatively in a first manner or a second manner, said first manner indicating that the parameters have identical values for all of said set of selected network devices, and said second manner indicating that the parameters are not identical in all of said set of selected network devices.

14. The machine-readable medium as claimed in claim 13 wherein said step of displaying parameters in said second manner comprises leaving fields for parameters that do not have identical values empty on said display screen.

15. The machine-readable medium as claimed in claim 13 wherein a first parameter in said set of parameters that has two possible settings and said step of displaying further comprises displaying an unselected first radio button for a first possible setting and an unselected second radio button for said second possible setting.

16. The machine-readable medium as claimed in claim 13 wherein said step of displaying a set of parameters further comprises displaying a subset of parameters that can not be the same for said set of selected network devices in a manner indicating that the subset of parameters can not be modified.

17. The machine-readable medium as claimed in claim 16 wherein said substep of displaying said subset of parameters further comprises displaying said subset of parameters as being "grayed-out".

18. The machine-readable medium as claimed in claim 13 further comprising the steps of:

receiving user inputs that edits one of said parameters on said display screen to generate a modified parameter; and sending said modified parameter to said set of selected network devices.

19. An apparatus for displaying parameter settings for more than one network device, said apparatus comprising:

a processor;

a memory coupled to said processor;

a bus coupled to said processor;

a user input device coupled to said bus;

a display controller coupled to said bus, said display controller controlling a visual display screen;

a network controller coupled to said bus, said network controller coupled to a computer network that comprises a plurality of network devices; and a network management program residing in said memory, said network management program for performing the steps of:

displaying a list of network devices on said visual display screen;

receiving user input from said user input device that selects a set from said more than one network devices to generate a set of selected network devices; and displaying a set of parameters for said set of selected network devices on said display screen, said step of displaying comprising displaying the parameters alternatively in a first manner or a second manner, said first manner indicating that the parameters have identical values for all of said set of selected network devices, and said second manner indicating that the parameters are not identical in all of said set of selected network devices.

20. The apparatus as claimed in claim 19 wherein said network management program further performs the steps of:

receiving user inputs that edits one of said parameters on said display screen to generate a modified parameter; and sending said modified parameter to said set of selected network devices.

* * * * *